United States Patent
Szczesny et al.

(10) Patent No.: US 8,062,073 B1
(45) Date of Patent: Nov. 22, 2011

(54) RECEPTACLE CONNECTOR

(75) Inventors: David Szczesny, Hershey, PA (US);
Michael Eugene Shirk, Grantville, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/874,847

(22) Filed: Sep. 2, 2010

(51) Int. Cl.
*H01R 24/00* (2011.01)

(52) U.S. Cl. ......................................... 439/660

(58) Field of Classification Search ............... 439/660, 439/79, 607.08, 607.11, 939
See application file for complete search history.

(56) References Cited

U.S. PATENT DOCUMENTS

| | | | | |
|---|---|---|---|---|
| 7,686,656 B2 * | 3/2010 | Zheng et al. | | 439/660 |
| 7,841,872 B2 * | 11/2010 | Zhang et al. | | 439/79 |
| 7,841,905 B2 * | 11/2010 | Zheng et al. | | 439/660 |
| 2010/0015855 A1 * | 1/2010 | Chiang | | 439/660 |
| 2010/0015856 A1 * | 1/2010 | Yamakami | | 439/660 |
| 2010/0035470 A1 * | 2/2010 | Liu et al. | | 439/607.08 |

* cited by examiner

*Primary Examiner* — Jean Duverne

(57) ABSTRACT

A receptacle connector includes a housing having a slot configured to receive a mating connector therein. Contacts are held by the housing. The contacts include mating segments that are arranged side-by-side within a row that extends along a row axis. The mating segments of the contacts include mating interfaces that are exposed within the slot for engagement with the mating connector. The contacts include a differential pair of signal contacts. The mating segments of the signal contacts within the differential pair are arranged within a column that extends along a column axis that is oriented non-parallel to the row axis.

18 Claims, 7 Drawing Sheets

RECEPTACLE CONNECTOR

BACKGROUND OF THE INVENTION

The subject matter described and/or illustrated herein relates generally to transceiver assemblies, and more particularly, to receptacle connectors for use in transceiver assemblies.

Various types of fiber optic and copper based transceiver assemblies that permit communication between host equipment and external devices are known. These transceiver assemblies typically include a module assembly that can be pluggably connected to a receptacle connector in the host equipment. The module assemblies are constructed according to various standards for size and compatibility, one standard being the Quad Small Form-factor Pluggable (QSFP) module standard. Conventional QSFP modules and receptacle assemblies perform satisfactorily conveying data signals at rates up to 10 gigabits per second (Gbps). Another pluggable module standard, the XFP standard, calls for the transceiver module to also convey data signals at rates up to 10 Gbps.

As electrical and optical devices become smaller, the signal paths thereof become more densely grouped. Moreover, the rate at which the data signals propagate along the signal paths is continually increasing to satisfy the demand for faster devices. Accordingly, there is a demand for transceiver assemblies that can handle the increased signal rates and/or that have a higher density of signal paths. However, because of the increased signal rates and/or higher density, adjacent differential pairs of signal contacts within a transceiver assembly may interfere with each other, which is commonly referred to as "crosstalk". Such crosstalk can become a relatively large contributor to errors along the signal paths of the transceiver assembly. Coupling between signal contacts within the same differential pair may also contribute to errors along the signal paths of the transceiver assembly. Moreover, the increased signal rates and/or higher density may make it difficult to maintain a desired impedance value of the transceiver assembly, which may result in impedance discontinuities between the transceiver assembly and the host equipment and/or the external device.

BRIEF DESCRIPTION OF THE INVENTION

In one embodiment, a receptacle connector includes a housing having a slot configured to receive a mating connector therein. Contacts are held by the housing. The contacts include mating segments that are arranged side-by-side within a row that extends along a row axis. The mating segments of the contacts include mating interfaces that are exposed within the slot for engagement with the mating connector. The contacts include a differential pair of signal contacts. The mating segments of the signal contacts within the differential pair are arranged within a column that extends along a column axis that is oriented non-parallel to the row axis.

In another embodiment, a transceiver assembly includes a pluggable module having a printed circuit that includes a signal side and an opposite auxiliary side. The printed circuit further includes a mating edge that includes a portion of the signal side and a portion of the auxiliary side. Signal terminations are arranged along the mating edge on the signal side. Auxiliary terminations are arranged along the mating edge on the auxiliary side. The transceiver assembly also includes a receptacle connector, which includes a housing having a slot configured to receive the mating edge of the printed circuit of the pluggable module therein. Contacts are held by the housing. The contacts include signal contacts and auxiliary contacts. The signal contacts have signal mating segments arranged within a first row in the housing. The signal mating segments include signal mating interfaces that are exposed within the slot and are configured to engage the signal terminations on the signal side of the printed circuit. The auxiliary contacts have auxiliary mating segments arranged within a second row in the housing. The auxiliary mating segments include auxiliary mating interfaces that are exposed within the slot and are configured to engage the auxiliary terminations on the auxiliary side of the printed circuit. The signal contacts are configured to convey data signals at a greater data transmission rate than the auxiliary contacts.

In another embodiment, a receptacle connector includes a housing having a slot configured to receive a mating connector therein. Contacts are held by the housing. The contacts include mating segments that are arranged side-by-side within a row. The mating segments of the contacts include mating interfaces that are exposed within the slot for engagement with the mating connector. The contacts include first and second differential pairs of signal contacts. The signal contacts within the first differential pair are held by a first dielectric body that is held by the housing. The signal contacts within the second differential pair are held by a second dielectric body that is held by the housing. The second dielectric body is discrete from the first dielectric body.

DETAILED DESCRIPTION OF THE INVENTION

Figure 1:
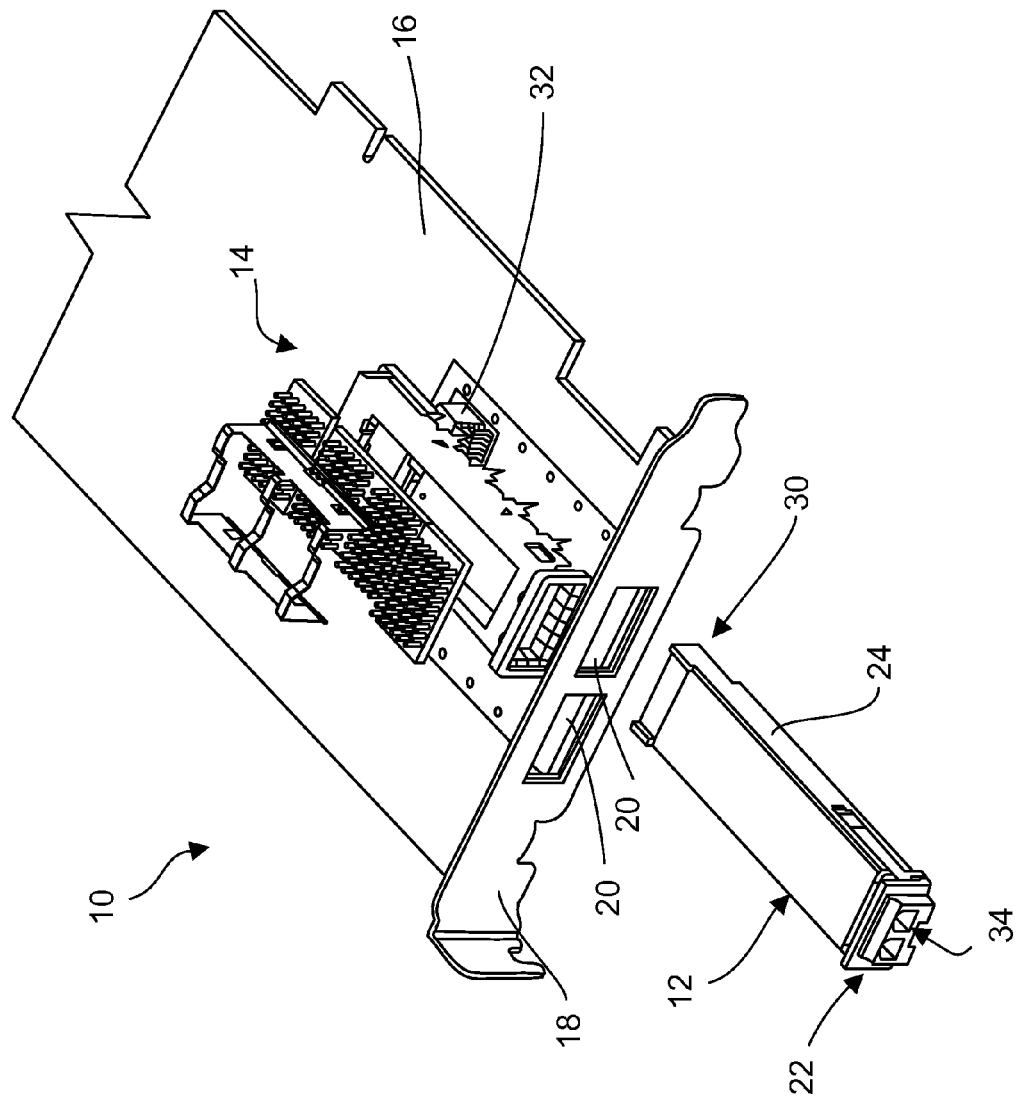
FIG. 1 is an exploded perspective view of an exemplary embodiment of a transceiver assembly.

FIG. 1 is a perspective view of a portion of an exemplary embodiment of a transceiver assembly 10. In the exemplary embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 25 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or the exemplary type of transceiver assembly shown and described herein.

The transceiver assembly 10 includes a pluggable module 12 configured for pluggable insertion into a receptacle assembly 14 that is mounted on a host printed circuit 16. The host printed circuit may be mounted in a host system (not shown) such as, but not limited to, a router, a server, a computer, and/or the like. The host system typically includes a conductive chassis having a bezel 18 including an opening 20 extending therethrough in substantial alignment with the receptacle assembly 14. The receptacle assembly 14 is optionally electrically connected to the bezel 18. The pluggable module 12 is configured to be inserted into the receptacle assembly 14. Specifically, the pluggable module 12 is inserted into the receptacle assembly 14 through the bezel opening 20 such that a front end 22 of the pluggable module 12 extends outwardly from the receptacle assembly 14. The pluggable module 12 includes a housing 24 that forms a protective shell for a printed circuit 26 (FIGS. 2 and 3) that is disposed within the housing 24. The printed circuit 26 carries circuitry, traces, paths, devices, and/or the like that perform transceiver functions in a known manner. An edge 28 (FIGS. 2 and 3) of the printed circuit 26 is exposed at a rear end 30 of the housing 24. The edge 28 is pluggable into the receptacle assembly 14 as described below. The edge 28 may be referred to herein as a "mating edge".

In general, the pluggable module 12 and the receptacle assembly 14 may be used in any application requiring an interface between a host system and electrical and/or optical signals. The pluggable module 12 interfaces to the host system through the receptacle assembly 14 via a receptacle connector 32 of the receptacle assembly 14. The pluggable module 12 interfaces to one or more optical cables (not shown) and/or one or more electrical cables (not shown) through a connector interface 34 at the front end 22. The pluggable module 12 may be referred to herein as a "mating connector".

Figure 2:
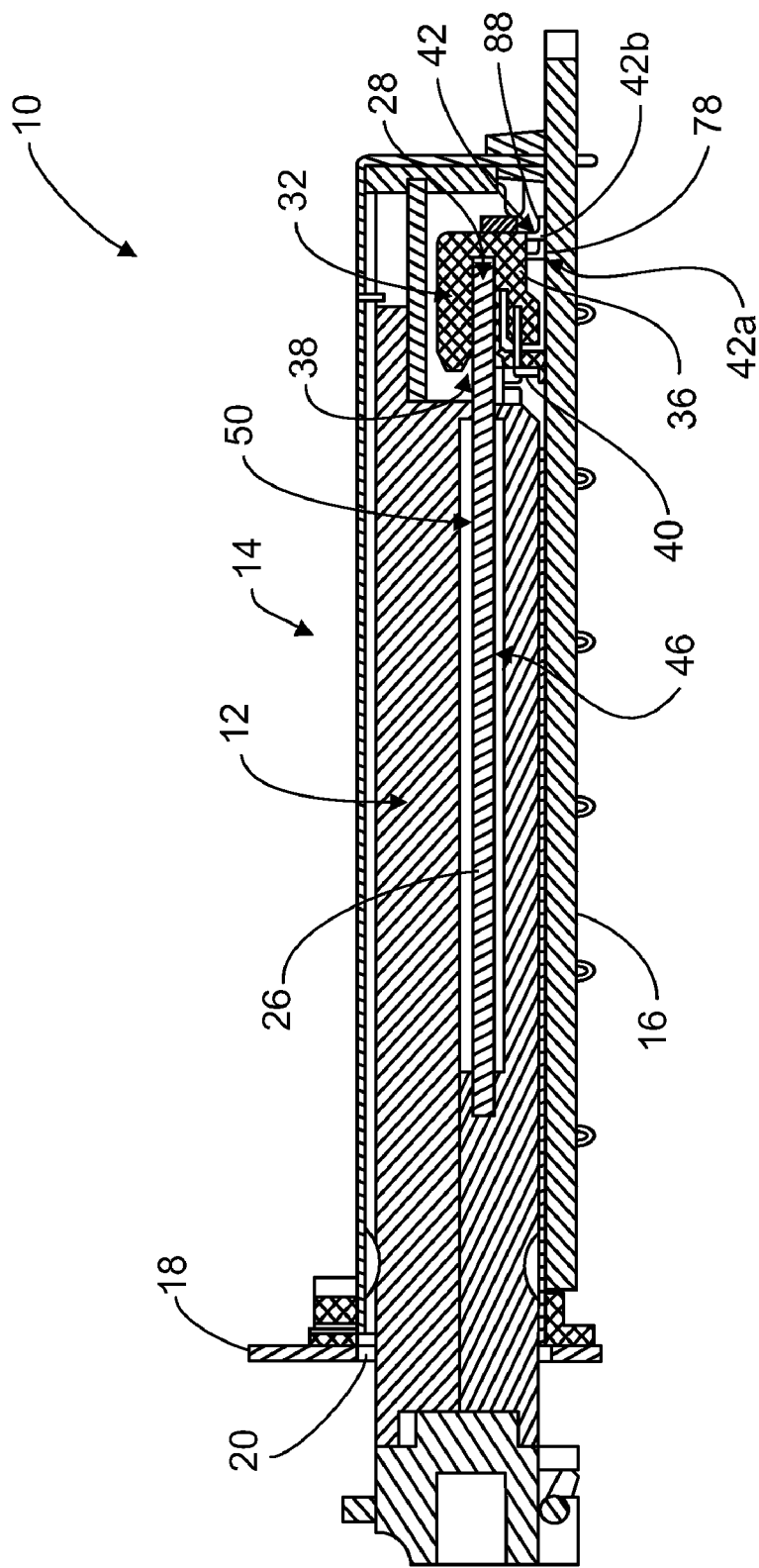
FIG. 2 is a cross-sectional view of the transceiver assembly shown in FIG. 1 illustrating an exemplary embodiment of a pluggable module mated with an exemplary embodiment of a receptacle assembly.

FIG. 2 is a cross-sectional view of the transceiver assembly 10 illustrating the pluggable module 12 mated with the receptacle assembly 14. The receptacle connector 32 is mounted on the host printed circuit 16. The receptacle connector 32 includes a housing 36 having a slot 38. The slot 38 of the receptacle connector 32 receives the edge 28 of the printed circuit 26 therein when the pluggable module is mated with the receptacle connector 32. The receptacle connector 32 includes contacts 40 and contacts 42. The contacts 40 extend within the slot 38 and engage corresponding terminations 44 (FIG. 3) on a side 46 of the printed circuit 26. The contacts 42 also extend within the slot 38, but the contacts 42 engage corresponding terminations 48 and 49 (FIG. 3) on a side 50 of the printed circuit 26 that is opposite the side 46. Engagement between the contacts 40 and the corresponding terminations 44 establishes electrical and/or optical connections between the printed circuit 26 and circuitry, traces, paths, devices, and/or the like on the host printed circuit 16. The engagement between the contacts 42 and the corresponding terminations 48 and 49 also establishes electrical and/or optical connections between the printed circuit 26 and circuitry, traces, paths, devices, and/or the like on the host printed circuit 16. Each of the contacts 40 may be referred to herein as an "auxiliary contact". The side 46 of the printed circuit 26 may be referred to herein as an "auxiliary side", while the side 50 of the printed circuit 26 may be referred to herein as a "signal side".

Figure 3:
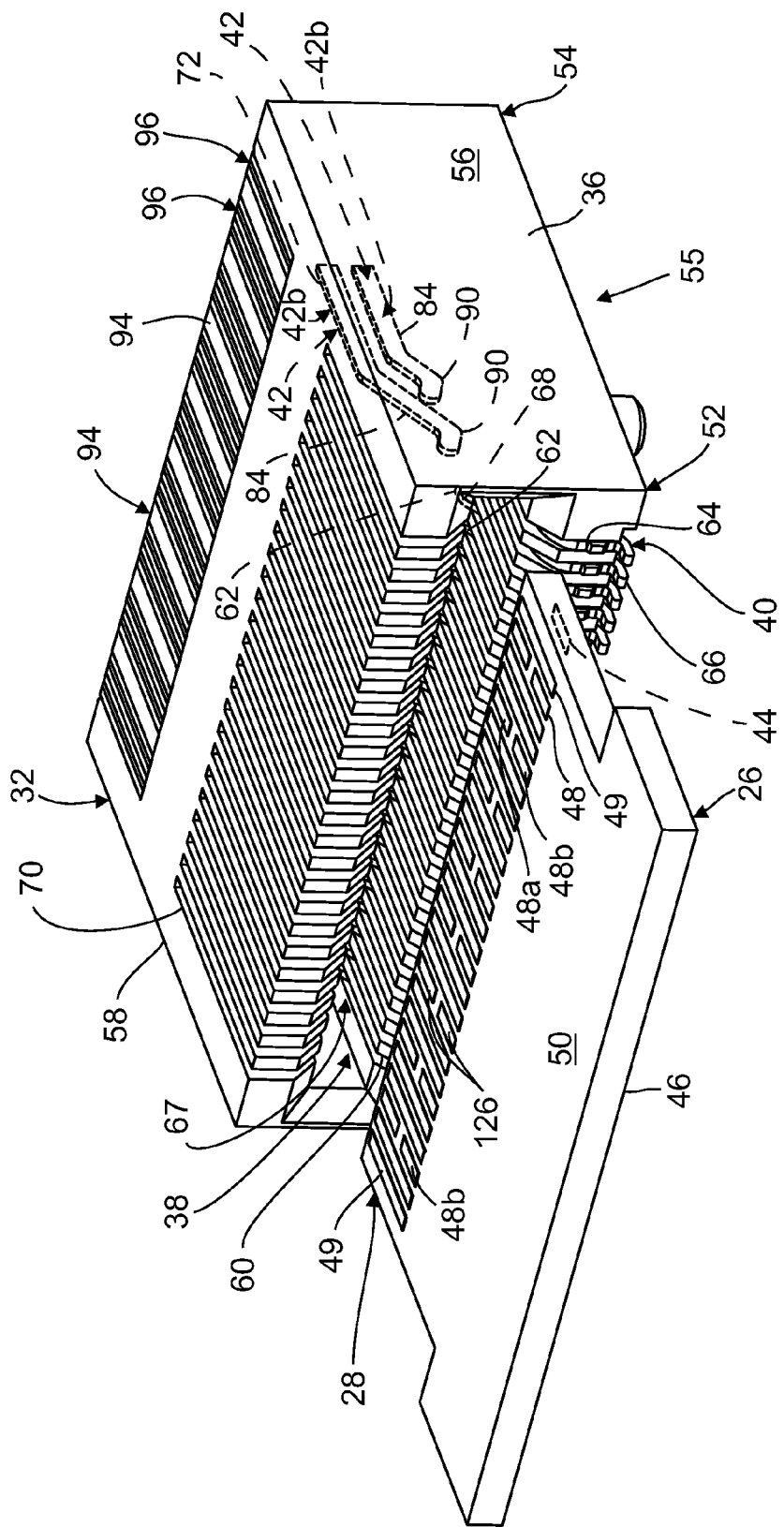
FIG. 3 is a perspective view of a portion of the transceiver assembly shown in FIGS. 1 and 2 illustrating an exemplary embodiment of a receptacle connector of the receptacle assembly shown in FIG. 2.

FIG. 3 is a perspective view of a portion of the transceiver assembly 10 illustrating an exemplary embodiment of the receptacle connector 32. A portion of the printed circuit 26 of the pluggable module 12 is also shown in FIG. 3. The receptacle connector 32 includes the housing 36, which extends from a front end 52 to a rear end 54 and includes a bottom side 55. The housing 36 is configured to be mounted on the host printed circuit 16 (FIGS. 1 and 2) at the bottom side 55. The front end 52 of the housing 36 includes the slot 38. More particularly, the slot 38 extends through the front end 52 and into the housing 36 toward the rear end 54. The slot 38 optionally extends through one or both opposite sides 56 and 58 of the housing 36.

The contacts 40 of the receptacle connector 32 are held by the housing 36. Optionally, the housing 36 includes a plurality of grooves 60 that receive corresponding contacts 40 therein. The grooves 60 may facilitate holding the contacts 40 in position relative to one another (e.g. side-to-side position). The contacts 40 include mating segments 62, intermediate segments 64, and mounting feet 66. The mating segments 62 of the contacts 40 are arranged within a row 67 and extend within the slot 38. The mating segments 62 include mating interfaces 68 that are exposed within the slot 38. As can be seen in FIG. 3, the edge 28 of the printed circuit 26 of the pluggable module 12 includes a portion of the side 46 of the printed circuit 26. Accordingly, the terminations 44 are arranged along the edge 28 on the side 46 of the printed circuit 26. When the edge 28 of the printed circuit 26 is received within the slot 38, the mating interfaces 68 of the contacts 40 engage the corresponding terminations 44 on the side 46 of the printed circuit 26. The intermediate segments 64 extend from the mating segments 62 to the mounting feet 66. The row 67 may be referred to herein as a "second row".

As can be seen in FIG. 3, the mounting feet 66 of the contacts 40 extend along the front end 52 of the housing 36. In the exemplary embodiment, the mounting foot 66 of each contact 40 is configured to be surface mounted to the host printed circuit 16 (FIGS. 1 and 2). More particularly, the mounting feet 66 are mounted on corresponding terminations (not shown) on the host printed circuit 16 in electrical and/or optical connection therewith. In an alternative embodiment, one or more of the contacts 40 is mounted on the host printed circuit 16 using another type of mounting than surface mounting, such as, but not limited to, using a compliant pin (instead of the mounting foot 66) that is received within a via (not shown) of the host printed circuit 16. The mating segment 62 of each contact 40 may be referred to herein as an "auxiliary mating segment". The mating interface 68 of each contact 40 may be referred to herein as an "auxiliary mating interface". The mounting foot 66 of each contact 40 may be referred to herein as an "auxiliary mounting foot".

The receptacle connector 32 may include any number of the contacts 40. Each of the contacts 40 may be a signal contact, a ground contact, or a power contact. Optionally, some or all contacts 40 used as signal contacts may be arranged in pairs with each signal contact within a pair conveying a differential signal, thus defining one or more differential pairs. Within the arrangement of the contacts 40, one or more ground contacts may be provided between adjacent differential pairs of signal contacts. Any other contact arrangement of the contacts 40 may be provided.

The housing 36 of the receptacle connector 32 also holds the contacts 42. The contacts 42 mate with terminations 48 and 49 (FIG. 3) on the same side 50 (FIGS. 2 and 3) of the printed circuit 26 (FIGS. 2 and 3). The housing 36 includes a plurality of optional grooves 70 that receive corresponding contacts 42 therein. Similar to the grooves 60, the grooves 70 may facilitate holding the contacts 42 in position relative to one another (e.g. side-to-side position).

Optionally, some or all of the contacts 42 of the receptacle connector 32 convey data signals at a higher rate than some or all of the contacts 40 of the receptacle connector 32. For example, in some embodiments, signal contacts 42a (FIGS. 2, 4, 5, and 7) of the contacts 42 convey data signals at a data rate of at least 10 Gbps, while the contacts 40 convey data signals at less than 10 Gbps. Moreover, and for example, in some embodiments the signal contacts 42a convey data signals at a data transmission rate of at least 25 Gbps, while the contacts 40 convey data signals at less than 25 Gbps. Moreover, and for example, in some embodiments the signal contacts 42a convey data signals at a data transmission rate of between approximately 20 Gbps and approximately 30 Gbps, while the contacts 40 convey data signals at less than 20 Gbps. In other embodiments, some or all of the contacts 42 of the receptacle connector 32 convey data signals at approximately the same or a lesser rate than some or all of the contacts 40 of the receptacle connector 32. For the purposes of comparison with the data rate of any of the signal contacts 42a, any contact 40 that conveys electrical power or electrical ground will be considered to convey data signals at a rate of approximately 0 Gbps.

Figure 4:
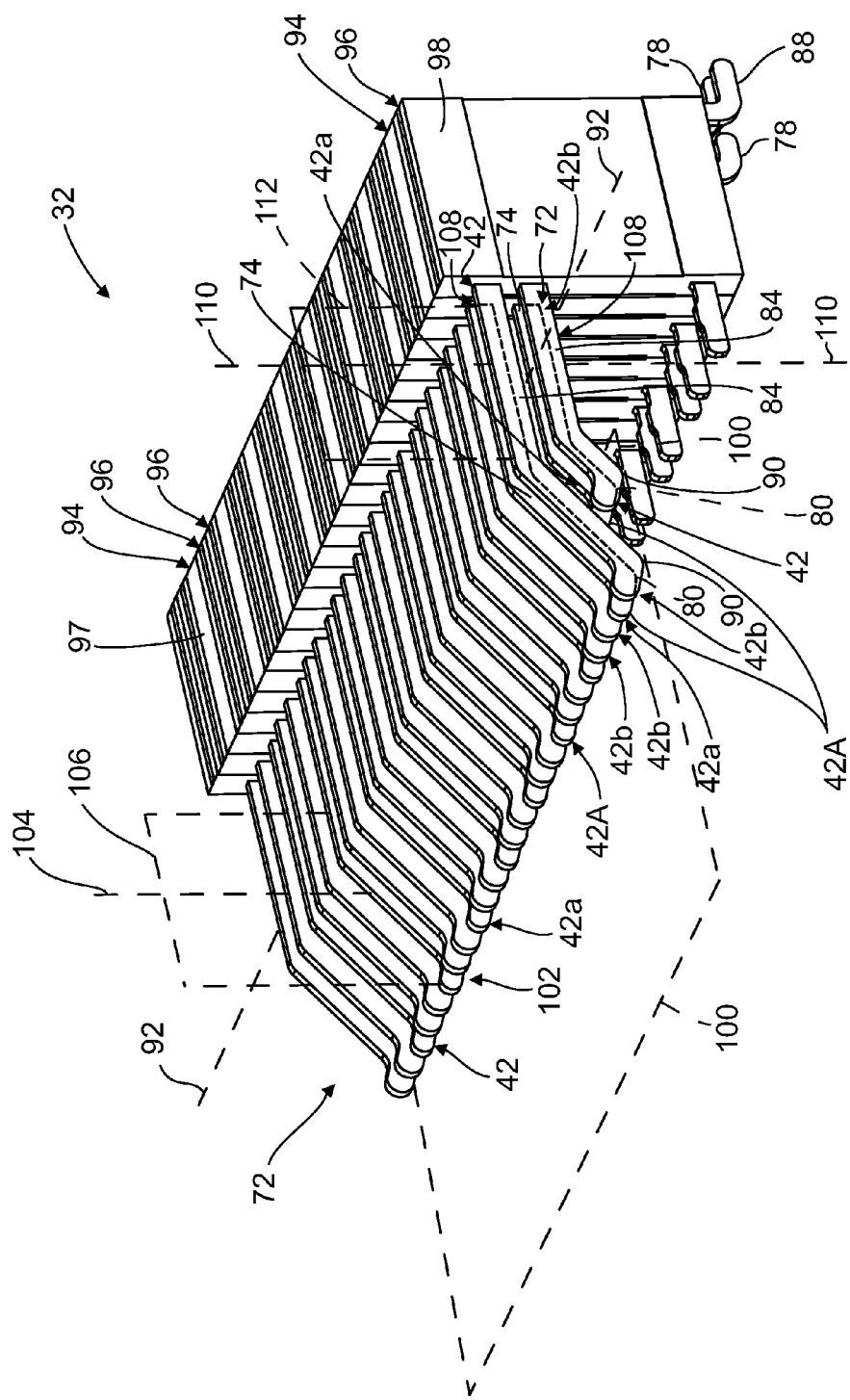
FIG. 4 is a perspective view of a portion of the receptacle connector shown in FIG. 3.

FIG. 4 is a perspective view of a portion of the receptacle connector 32 illustrating a row 72 of the contacts 42. The housing 36 (FIGS. 2 and 3) and the contacts 40 (FIGS. 2 and 3) of the receptacle connector 32 have been removed from FIG. 4 for clarity. The contacts 42 include the signal contacts 42a and ground contacts 42b. In the exemplary embodiment, the signal contacts 42a are arranged in differential pairs 42A. Alternatively, some or all of the signal contacts 42a are not arranged in differential pairs. The signal contacts 42a include mating segments 74, intermediate segments 76 (FIG. 5), and mounting feet 78. As should be apparent from a comparison of FIGS. 3 and 4, the mating segments 74 of the signal contacts 42a extend within the slot 38 (FIGS. 2 and 3) of the receptacle connector 32. The mating segments 74 of the signal contacts 42a include mating interfaces 80 that are exposed within the slot 38 and engage corresponding ones of the terminations 48 (FIG. 3) on the side 50 (FIGS. 2 and 3) of the printed circuit 26 (FIGS. 2 and 3). The mating segment 74 of each signal contact 42a may be referred to herein as a "signal mating segment". The mating interface 80 of each signal contact 42a may be referred to herein as a "signal mating interface". The mounting foot 78 of each signal contact 42a may be referred to herein as a "signal mounting foot". Each differential pair 42A may be referred to herein as a "first differential pair" and/or a "second differential pair".

The ground contacts 42b also include mating segments 84, intermediate segments 86 (FIG. 6), and mounting feet 88. The mating segments 84 of the ground contacts 42b extend within the slot 38 and include mating interfaces 90 that are exposed within the slot 38 and engage corresponding ones of the terminations 49 on the side 50 of the printed circuit 26. The receptacle connector 32 may include any number of the contacts 42, including any number of signal contacts 42a, any number of ground contacts 42b, and any number of differential pairs 42A. As can be seen in FIG. 2, the mounting feet 78 and 88 of the signal and ground contacts 42a and 42b extend along the rear end 54 of the housing 36 of the receptacle connector 32.

The mating segments 74 and 84 of the signal and ground contacts 42a and 42b, respectively, are arranged side-by-side within the row 72, which extends along a row axis 92. As should be apparent from a comparison of FIGS. 3 and 4, the row 72 of the mating segments 74 and 84 of the contacts 42 opposes the row 67 (FIG. 3) of the mating segments 62 (FIG. 3) of the contacts 40 (FIGS. 2 and 3). The mating interfaces 80 and 90 of the contacts 42 oppose the mating interfaces 68 (FIG. 3) of the contacts 40 within the slot 38.

Optionally, the housing 36 (FIGS. 2 and 3) of the receptacle connector 32 holds a plurality of contact modules 94 and 96 that include the signal and ground contacts 42a and 42b, respectively. More particularly, and as will be described in more detail below, the signal and ground contacts 42a and 42b are held by corresponding dielectric bodies 97 and 98, respectively, that are in turn held by the housing 36 of the receptacle connector 32. As should be apparent from the Figures, each of the dielectric bodies 97 is a discrete component from each of the dielectric bodies 98 and each of the other dielectric bodies 97, and vice versa. Similarly, each of the dielectric bodies 98 is a discrete component from each of the dielectric bodies 97 and each of the other dielectric bodies 98. Optionally, each body 97 holds two signal contacts 42a and each body 98 holds a single ground contact 42b. The two signal contacts 42a held by a body 97 are optionally a differential pair 42A. In the exemplary embodiment, each body 97 holds a differential pair 42A of the signal contacts 42a. Accordingly, in the exemplary embodiment, within each differential pair 42A, the signal contacts 42a thereof are held by a common dielectric body 97. The row 72 may be referred to herein as a "first row".

As described above, the mating segments 74 and 84 of the signal and ground contacts 42a and 42b, respectively, are arranged side-by-side within the row 72 that extends along the row axis 92. Within the row 72, the mating interfaces 80 and 90 of the signal and ground contacts 42a and 42b, respectively, extend within a common mating interface plane 100 that extends parallel to the row axis 92. Within each differential pair 42A, the two signal contacts 42a of the differential pair 42A are arranged within a column 102 that extends along a column axis 104. As can be seen in FIG. 4, in the exemplary embodiment, the column axis 104 of each differential pair 42A is oriented approximately perpendicular to the row axis 92. In other words, within each differential pair 42A, the mating segments 74 of the two signal contacts 42a of the differential pair 42A extend within a common differential pair plane 106 that extends approximately perpendicular to the mating interface plane 100. However, the column axis 104 and the differential pair plane 106 of each differential pair 42A may be oriented at any non-parallel angle relative to the row axis 92 and the mating interface plane 100, respectively. Each column 102 may be referred to herein as a "signal column". Each column axis 104 may be referred to herein as a "signal column axis".

Optionally, each ground contact 42b includes two mating segments 84 that each includes one of the mating interfaces 90. The two mating segments 84 of each ground contact 42b are optionally arranged within a column 108 that extends along a column axis 110. The two mating segments 84 of each ground contact 42b extend within a common ground plane 112. In the exemplary embodiment, the column axis 110 and the ground plane 112 of each ground contact 42b are oriented approximately perpendicular to the row axis 92 and the mating interface plane 100, respectively. However, the column axis 110 of each ground contact 42b may be oriented at any angle relative to the row axis 92. Moreover, the ground plane 112 of each ground contact 42b may be oriented at any angle relative to the mating interface plane 100. Each column 108 may be referred to herein as a "ground column". Each column axis 110 may be referred to herein as a "ground column axis".

As can be seen in FIG. 4, within the row 72 of the mating segments 74 and 84, two ground contacts 42b are provided between adjacent differential pairs 42A of the signal contacts 42a. The mating segments 84 of the two ground contacts 42b extend within the row 72 between the mating segments 74 of the signal contacts 42a of the two adjacent differential pairs 42A. Alternatively, only a single ground contact 42b extends between adjacent differential pairs 42A within the row 72. As will be described in more detail below, the mating segments 84 of the ground contacts 42b overlap corresponding ones of the mating segments 74 of the signal contacts 42a within the row 72 to facilitate shielding adjacent differential pairs 42A from each other. Shielding adjacent differential pairs 42A from each other may facilitate controlling an impedance of the receptacle connector 32 (which may include controlling both a differential and common mode impedance) and/or may facilitate reducing an amount of crosstalk, signal attenuation, and/or the like of the receptacle connector 32.

Figure 5:
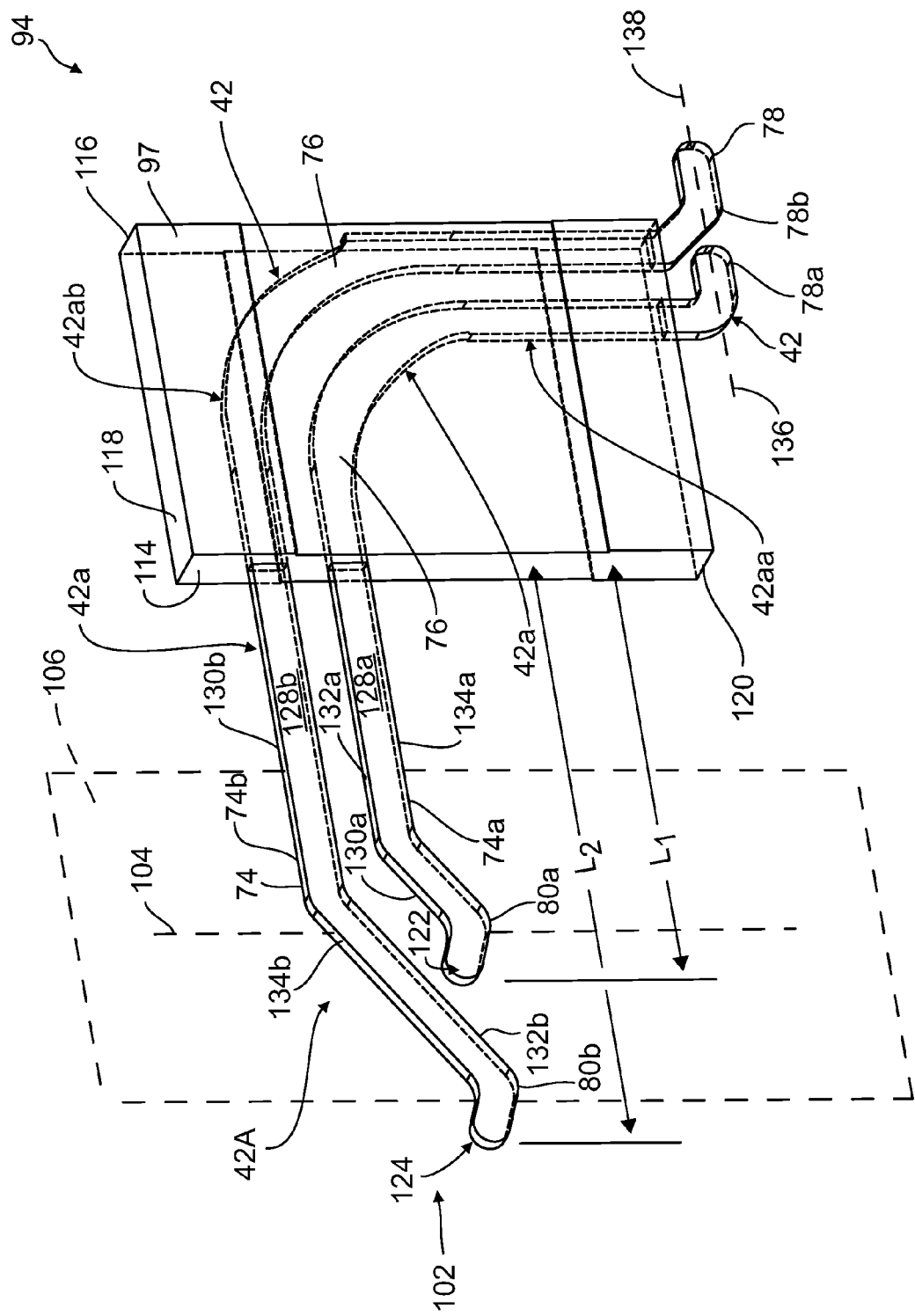
FIG. 5 is a perspective view of an exemplary embodiment of a contact module of the receptacle connector shown in FIGS. 3 and 4.

FIG. 5 is a perspective view of an exemplary embodiment of one of the contact modules 94. The contact module 94 includes a dielectric body 97 and the signal contacts 42a of a differential pair 42A. The signal contacts 42a include the mating segments 74, the intermediate segments 76, and the mounting feet 78. The intermediate segments 76 extend from the mating segments 74 to the mounting feet 78. The dielectric body 97 encapsulates the intermediate segments 76 of the signal contacts 42a.

The body 97 includes opposite faces 114 and 116, and opposite faces 118 and 120. The mating segments 74 of the signal contacts 42a extend outwardly from the face 114 of the body 97. As can be seen in FIG. 5, the mating segment 74 of one of the signal contacts 42a within the differential pair 42A extends a greater distance from the face 114 of the body 97 than the mating segment 74 of the other signal contact 42a within the differential pair 42A. More particularly, the differential pair 42A of the contact module 94 includes an inner signal contact 42aa and an outer signal contact 42ab. The mating segment 74a of the inner signal contact 42aa extends a length $L_1$ outwardly from the face 114 of the body 97 to a tip 122. The mating segment 74b of the outer signal contact 42ab extends a length $L_2$ outwardly from the face 114 to a tip 124. The length $L_2$ is greater than the length $L_1$. Mating interfaces 80a and 80b of the inner and outer signal contacts 42aa and 42ab, respectively, are thus spaced different distances from the face 114 of the body 97. As can be seen in FIG. 5, the mating segment 74a of the inner signal contact 42aa is nested within a portion of the mating segment 74b of the outer signal contact 42ab.

Referring again to FIG. 3, the edge 28 of the printed circuit 26 of the pluggable module 12 includes a portion of the side 50 of the printed circuit 26. Accordingly, the terminations 48 and 49 are arranged along the edge 28 on the side 50 of the printed circuit 26. When the edge 28 of the printed circuit 26 is received within the slot 38, the mating interfaces 74 (FIGS. 4, 5, and 7) of the signal contacts 42a (FIGS. 2, 4, 5, and 7) engage the corresponding terminations 48 on the side 50 of the printed circuit 26. Specifically, the terminations 48 include differential pairs 126 of inner terminations 48a and outer terminations 48b. Each differential pair 126 includes an inner termination 48a and an outer termination 48b that are axially aligned with each other along the side 50 of the printed circuit 26.

Referring again to FIG. 5, the mating interface 80a of the inner signal contact 42aa of the differential pair 42A is configured to engage the inner termination 48a (FIG. 3) of a corresponding one of the differential pairs 126 (FIG. 3) of the terminations 48 (FIG. 3). The mating interface 80b of the outer signal contact 42ab of the differential pair 42A is configured to engage the outer termination 48b of the corresponding differential pair 126 of the terminations 48. When the edge 28 (FIGS. 2 and 3) of the printed circuit 26 (FIGS. 2 and 3) is received within the slot 38 (FIGS. 2 and 3) of the receptacle connector 32 (FIGS. 1-4 and 7), the mating segment 74a of the inner signal contact 42aa extends between the printed circuit 26 and a portion of the mating segment 74b of the outer signal contact 42ab.

As described above, the mating segments 74a and 74b of the inner and outer signal contacts 42aa and 42ab, respectively, of the contact module 94 are arranged within the column 102 that extends along the column axis 104 and extends within the differential pair plane 106. By arranging the inner and outer signal contacts 42aa and 42ab, respectively, of the same differential pair 42A within the column 102, coupling between the inner signal contact 42a and the outer signal contact 42b may be reduced or eliminated.

More particularly, the mating segment 74a of the inner signal contact 42aa includes opposite broad-side surfaces 128a and 130a and opposite edge-side surfaces 132a and 134a that extend between the broad-side surfaces 128a and 130a. The broad-side surfaces 128a and 130a have a greater surface area than the edge-side surfaces 132a and 134a. The edge-side surface 134a includes the mating interface 80a. Similar to the inner signal contact 42aa, the mating segment 74b of the outer signal contact 42ab includes opposite broad-side surfaces 128b and 130b and opposite edge-side surfaces 132b and 134b that extend between the broad-side surfaces 128b and 130b. The broad-side surfaces 128b and 130b have a greater surface area than the edge side surfaces 132b and 134b. The edge-side surfaces 132b include the mating interface 80b. In the exemplary embodiment, the broad-side surfaces 128a and 128b extend coplanar with each other, and the broad-side surface 130a and 130b extend coplanar with each other. By arranging the inner and outer signal contacts 42aa and 42ab, respectively, in the column 102, the edge-side surface 132a of the mating segment 74a of the inner signal contact 42aa faces the edge-side surface 132b of the mating segment 74b of the outer signal contact 42ab. Because the edge-side surfaces 132a and 132b face each other, coupling between the inner and outer signal contacts 42aa and 42ab, respectively, may be reduced or eliminated as compared with contacts within a differential pair that include broad-side surfaces that face each other. Reducing or eliminating coupling between the inner signal contact 42aa and the outer signal contact 42ab may facilitate controlling an impedance of the receptacle connector 32 (which may include controlling both a differential and common mode impedance) and/or may facilitate reducing an amount of crosstalk, signal attenuation, and/or the like of the receptacle connector 32.

The mounting feet 78 of the signal contacts 42a extend outwardly from the face 120 of the body 97. The inner signal contact 42aa includes a mounting foot 78a that extends a length along a central longitudinal axis 136. The outer signal contact 42ab includes a mounting foot 78b that extends a length along a central longitudinal axis 138. Optionally, the central longitudinal axes 136 and 138 of the mounting feet 78a and 78b, respectively, are aligned with each other. Alignment of the axes 136 and 138 may facilitate increasing a density of terminations (not shown) on the host printed circuit 16 (FIGS. 1 and 2) that engage the mounting feet 78.

Figure 6:
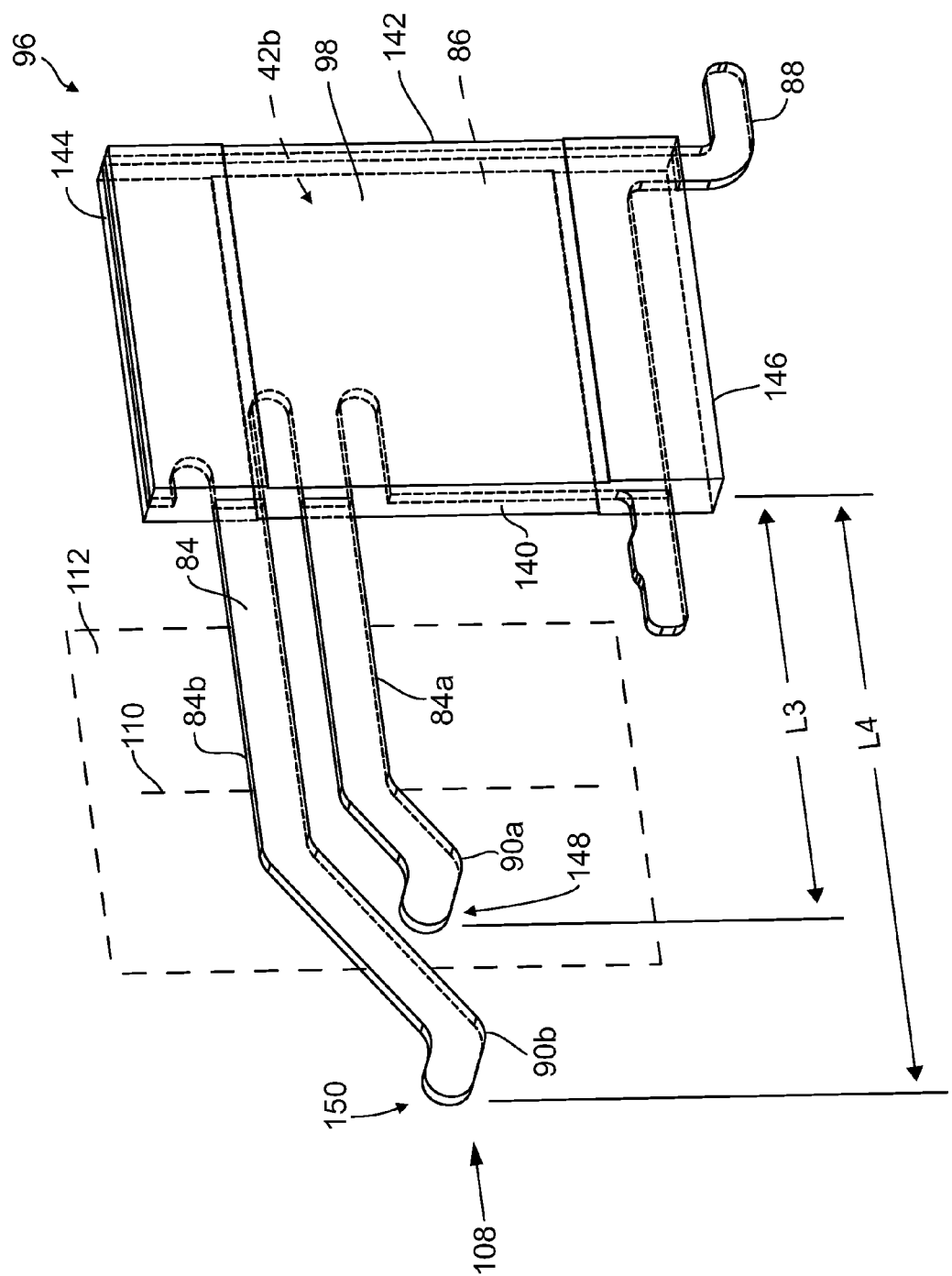
FIG. 6 is a perspective view of an exemplary embodiment of another contact module of the receptacle connector shown in FIGS. 3 and 4.

FIG. 6 is a perspective view of an exemplary embodiment of one of the contact modules 96. The contact module 96 includes a dielectric body 98 and a single ground contact 42b. The ground contact 42b includes two mating segments 84a and 84b, the intermediate segment 86, and the mounting foot 88. The intermediate segment 86 extends from the mating segments 84a and 84b to the mounting foot 88. The dielectric body 98 encapsulates the intermediate segment 86 of the ground contact 42b.

The body 98 includes opposite faces 140 and 142, and opposite faces 144 and 146. The mounting foot 88 of the ground contact 42b extends outwardly from the face 146 of the body 98. The mating segments 84a and 84b extend outwardly from the face 140 of the body 98. The mating segment 84b extends a greater distance from the face 140 of the body 98 than the mating segment 84a. More particularly, the mating segment 84a of the ground contact 42b extends a length $L_3$ outwardly from the face 140 of the body 98 to a tip 148. The mating segment 84b of the ground contact 42b extends a length $L_4$ outwardly from the face 140 to a tip 150. The length $L_4$ is greater than the length $L_3$. Mating interfaces 90a and 90b of the mating segments 84a and 84b, respectively, are thus spaced different distances from the face 140 of the body 98. The mating segment 84a of the ground contact 42b is nested within a portion of the mating segment 84b. The mating interfaces 90a and 90b of the mating segments 84a and 84b, respectively, are configured to engage the same termination 49 (FIG. 3) on the printed circuit 26 (FIGS. 2 and 3). When the edge 28 (FIGS. 2 and 3) of the printed circuit 26 is received within the slot 38 (FIGS. 2 and 3) of the receptacle connector 32 (FIGS. 1-4 and 7), the mating segment 84a extends between the printed circuit 26 and a portion of the mating segment 84b of the ground contact 42b. As described above, the mating segments 84a and 84b of the ground contact 42b of the contact module 96 are optionally arranged within the column 108 that extends along the column axis 110 and extends within the ground plane 112.

Figure 7:
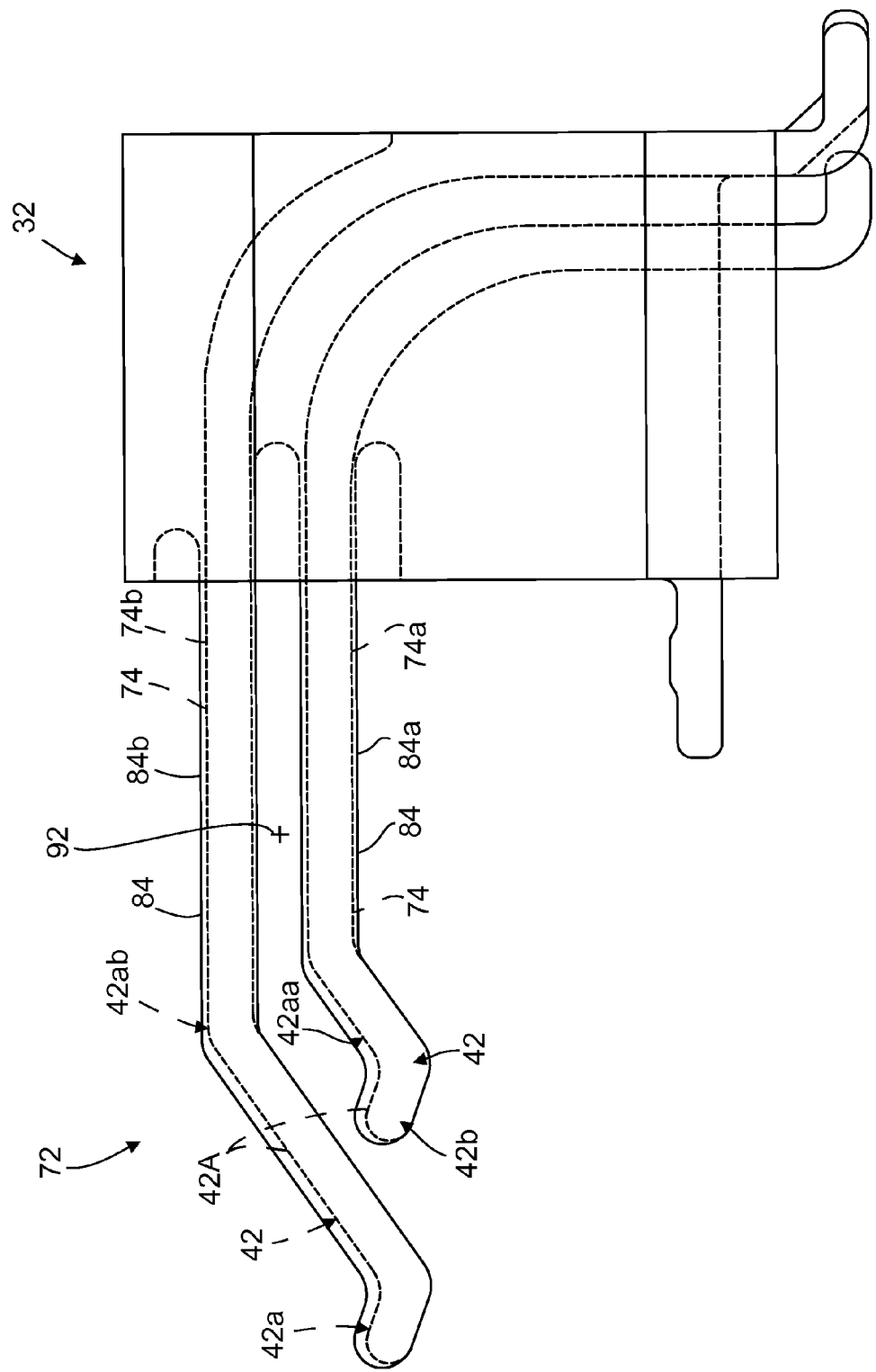
FIG. 7 is a side elevational view of the portion of the receptacle connector shown in FIG. 4.

FIG. 7 is a side elevational view of a portion of the receptacle connector 32 illustrating the row 72 of the contacts 42. The housing 36 (FIGS. 2 and 3) and the contacts 40 (FIGS. 2 and 3) of the receptacle connector 32 have been removed from FIG. 7 for clarity. As described above, the mating segments 84 of the ground contacts 42b overlap corresponding ones of the mating segments 74 of the signal contacts 42a within the row 72 to facilitate shielding adjacent differential pairs 42A from each other. More particularly, the mating segment 84b of each ground contact 42b extends between the mating segments 74b of the outer signal contacts 42ab of adjacent differential pairs 42A. As can be seen in FIG. 7, when viewed from a direction parallel to the row axis 92, the mating segment 84b of each ground contact 42b completely overlaps the mating segments 74b of the outer signal contacts 42ab. Similar to the mating segments 84b, the mating segment 84a of each ground contact 42b extends between the mating segments 74a of the inner signal contacts 42aa of adjacent differential pairs 42A. When viewed from a direction parallel to the row axis 92, the mating segment 84a of each ground contact 42b completely overlaps the mating segments 74a of the inner signal contacts 42aa. The overlap of the mating segments 74a and 74b of the signal contacts 42a by the mating segments 84a and 84b, respectively, of the ground contacts 42b facilitates increasing the amount of shielding between adjacent differential pairs 42A. Shielding adjacent differential pairs may facilitate controlling an impedance of the receptacle connector 32 (which may include controlling both a differential and common mode impedance) and/or may facilitate reducing an amount of crosstalk, signal attenuation, and/or the like of the receptacle connector 32.

The embodiments described and/or illustrated herein may provide a transceiver assembly having a reduced amount of crosstalk, signal attenuation, and/or the like as compared with at least some known transceiver assemblies. The embodiments described and/or illustrated herein may provide a transceiver assembly having less impedance discontinuities between the transceiver assembly and host equipment and/or an external device than at least some known transceiver assemblies. The embodiments described and/or illustrated herein may provide a transceiver assembly that is capable of handling increased data transmission rates while reducing or maintaining crosstalk, signal attenuation, and/or the like and/or while maintaining desired impedance values. For example, the embodiments described and/or illustrated herein may provide a transceiver assembly that is capable of handling increased data transmission rates of at least 25 Gbps while reducing or maintaining crosstalk, signal attenuation, and/or the like and/or while maintaining desired impedance values.

As used herein, the term "printed circuit" is intended to mean any electric circuit in which the conducting connections have been printed or otherwise deposited in predetermined patterns on an insulating substrate. Substrates of the printed circuits 16 and 26 may each be a flexible substrate or a rigid substrate. The substrates may be fabricated from and/or include any material(s), such as, but not limited to, ceramic, epoxy-glass, polyimide (such as, but not limited to, Kapton® and/or the like), organic material, plastic, polymer, and/or the like. In some embodiments, one or both of the substrates is a rigid substrate fabricated from epoxy-glass, such that the corresponding printed circuit 16 and/or 26 is what is sometimes referred to as a "circuit board" or a "printed circuit board".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A receptacle connector comprising:
    a housing comprising a slot configured to receive a mating connector therein; and
    contacts held by the housing, the contacts comprising mating segments that are arranged side-by-side within a row that extends along a row axis, the mating segments of the contacts comprising mating interfaces that are exposed within the slot for engagement with the mating connector, the contacts comprising a differential pair of signal contacts, wherein the mating segments of the signal contacts within the differential pair are arranged within a column that extends along a column axis that is oriented non-parallel to the row axis, the mating segments of the signal contacts within the differential pair comprising opposite broad-side surfaces and opposite edge-side surfaces that extend between the broad-side surfaces, wherein an edge-side surface of one of the signal contacts within the differential pair faces an edge-side surface of the other signal contact within the differential pair.

2. The receptacle connector according to claim 1, wherein the mating interfaces of the contacts extend within a common mating interface plane, the mating segments of the signal contacts within the differential pair extending within a common differential pair plane that extends approximately perpendicular to the mating interface plane.

3. The receptacle connector according to claim 1, wherein the mating interfaces of the contacts extend within a common mating interface plane, the mating segments of the signal contacts within the differential pair extending within a common differential pair plane that extends non-parallel to the mating interface plane.

4. The receptacle connector according to claim 1, wherein the column axis is oriented approximately perpendicular to the row axis.

5. The receptacle connector according to claim 1, wherein the mating interfaces of the signal contacts within the differential pair extend within a common mating interface plane that is oriented approximately parallel to the row axis.

6. The receptacle connector according to claim 1, wherein the signal contacts within the differential pair are held by a common dielectric body, the dielectric body being held by the housing and comprising a face, the mating segments of the signal contacts extending outwardly from the face of the body, wherein the mating segment of one of the signal contacts within the differential pair extends a greater distance from the face of the body than the mating segment of the other signal contact within the differential pair.

7. The receptacle connector according to claim 1, wherein the signal contacts are configured to convey data signals at a data transmission rate of between approximately 20 Gbps and approximately 30 Gbps.

8. The receptacle connector according to claim 1, wherein the column is a signal column and the column axis is a signal column axis, the contacts comprising a ground contact having two mating segments, the two mating segments of the ground contact being arranged within a ground column that extends along a ground column axis that is oriented non-parallel to the row axis.

9. The receptacle connector according to claim 1, wherein the contacts comprise two adjacent differential pairs of signal contacts and two ground contacts having mating segments that extend within the row between the mating segments of the two adjacent differential pairs of signal contacts.

10. A receptacle connector comprising:
a housing comprising a slot configured to receive a mating connector therein; and
contacts held by the housing, the contacts comprising mating segments that are arranged side-by-side within a row that extends along a row axis, the mating segments of the contacts comprising mating interfaces that are exposed within the slot for engagement with the mating connector, the contacts comprising a differential pair of signal contacts, wherein the mating segments of the signal contacts within the differential pair are arranged within a column that extends along a column axis that is oriented non-parallel to the row axis, wherein the mating segments of the signal contacts within the differential pair comprise opposite broad-side surfaces and opposite edge-side surfaces that extend between the broad-side surfaces, and wherein a broad-side surface of one of the signal contacts within the differential pair extends coplanar to a broad-side surface of the other signal contact within the differential pair.

11. A receptacle connector comprising:
a housing comprising a slot configured to receive a mating connector therein; and
contacts held by the housing, the contacts comprising mating segments that are arranged side-by-side within a row that extends along a row axis, the mating segments of the contacts comprising mating interfaces that are exposed within the slot for engagement with the mating connector, the contacts comprising a differential pair of signal contacts, wherein the mating segments of the signal contacts within the differential pair are arranged within a column that extends along a column axis that is oriented non-parallel to the row axis, and wherein the mating connector includes a printed circuit configured to be received within the slot, the signal contacts within the differential pair comprising an inner signal contact and an outer signal contact, the mating segment of the inner signal contact extending between the printed circuit and a portion of the mating segment of the outer signal contact when the printed circuit is received within the slot.

12. A transceiver assembly comprising:
a pluggable module having a printed circuit that includes a signal side and an opposite auxiliary side, the printed circuit further comprising a mating edge that includes a portion of the signal side and a portion of the auxiliary side, signal terminations being arranged along the mating edge on the signal side, auxiliary terminations being arranged along the mating edge on the auxiliary side; and
a receptacle connector comprising:
a housing comprising a slot configured to receive the mating edge of the printed circuit of the pluggable module therein; and
contacts held by the housing, the contacts comprising signal contacts and auxiliary contacts, the signal contacts having signal mating segments arranged within a first row in the housing, the signal mating segments comprising signal mating interfaces that are exposed within the slot and are configured to engage the signal terminations on the signal side of the printed circuit, the auxiliary contacts having auxiliary mating segments arranged within a second row in the housing, the auxiliary mating segments comprising auxiliary mating interfaces that are exposed within the slot and are configured to engage the auxiliary terminations on the auxiliary side of the printed circuit, wherein the signal contacts are configured to convey data signals at a greater data transmission rate than the auxiliary contacts.

13. The transceiver assembly according to claim 12, wherein at least one of the auxiliary contacts is configured to convey electrical power.

14. The transceiver assembly according to claim 12, wherein the housing extends from a rear end to a front end, the front end of the housing comprising the slot, the signal contacts comprising signal mounting feet, the auxiliary contacts comprising auxiliary mounting feet, wherein the signal mounting feet extend along the rear end of the housing and the auxiliary mounting feet extend along the front end of the housing.

15. The transceiver assembly according to claim 12, wherein the first row extends along a row axis, the signal contacts comprising a differential pair of signal contacts, wherein the signal mating segments of the signal contacts within the differential pair are arranged within a column that extends along a column axis that is oriented non-parallel to the row axis.

16. A receptacle connector comprising:

a housing comprising a slot configured to receive a mating connector therein; and contacts held by the housing, the contacts comprising mating segments that are arranged side-by-side within a row, the mating segments of the contacts comprising mating interfaces that are exposed within the slot for engagement with the mating connector, the contacts comprising first and second differential pairs of signal contacts, the signal contacts within the first differential pair being held by a first dielectric body that is held by the housing, the signal contacts within the second differential pair being held by a second dielectric body that is held by the housing, the second dielectric body being discrete from the first dielectric body, wherein the first dielectric body comprises a face, the mating segments of the signal contacts of the first differential pair extending outwardly from the face of the first dielectric body, wherein the mating segment of one of the signal contacts within the first differential pair extends a greater distance from the face of the first dielectric body than the mating segment of the other signal contact within the first differential pair.

17. The receptacle connector according to claim 16, wherein the row extends along a row axis, the mating segments of the signal contacts within the first differential pair being arranged within a column that extends along a column axis that is oriented non-parallel to the row axis.

18. The receptacle connector according to claim 16, wherein the mating interfaces of the contacts extend within a common mating interface plane, the mating segments of the signal contacts within the first differential pair extending within a common differential pair plane that extends approximately perpendicular to the mating interface plane.

* * * * *